US009016085B2

(12) United States Patent
Görz et al.

(10) Patent No.: US 9,016,085 B2
(45) Date of Patent: Apr. 28, 2015

(54) REFRIGERATING APPLIANCE WITH CIRCULATING AIR COOLING

(75) Inventors: Alexander Görz, Aalen (DE); Ralf Spiller, Giengen (DE)

(73) Assignee: BSH Bosch und Siemens Hausgerate GmbH, Munich (DE)

( * ) Notice: Subject to any disclaimer, the term of this patent is extended or adjusted under 35 U.S.C. 154(b) by 614 days.

(21) Appl. No.: 11/920,336

(22) PCT Filed: Jun. 8, 2005

(86) PCT No.: PCT/EP2005/052628
§ 371 (c)(1),
(2), (4) Date: Nov. 8, 2007

(87) PCT Pub. No.: WO2006/119805
PCT Pub. Date: Nov. 16, 2006

(65) Prior Publication Data
US 2009/0064706 A1    Mar. 12, 2009

(30) Foreign Application Priority Data

May 10, 2005 (DE) .......................... 10 2005 021 535
May 10, 2005 (DE) .......................... 10 2005 021 557
May 10, 2005 (DE) .......................... 10 2005 021 560

(51) Int. Cl.
*F25D 17/04*    (2006.01)
*F25D 17/06*    (2006.01)
*F25D 23/06*    (2006.01)

(52) U.S. Cl.
CPC ............ *F25D 23/065* (2013.01); *F25D 17/065* (2013.01); *F25D 2201/126* (2013.01); *F25D 2317/0655* (2013.01); *F25D 2317/0665* (2013.01); *F25D 2317/067* (2013.01); *F25D 2317/0672* (2013.01); *F25D 2317/0683* (2013.01); *F25D 2400/04* (2013.01); *Y02B 40/34* (2013.01)

(58) Field of Classification Search
USPC ........................................... 62/407, 414, 419
See application file for complete search history.

(56) References Cited

U.S. PATENT DOCUMENTS

| 3,104,533 | A | | 9/1963 | O'Connell |
| 3,403,533 | A | * | 10/1968 | Bollenbacher .................. 62/408 |
| 4,879,881 | A | | 11/1989 | Madigan |
| 6,351,967 | B1 | * | 3/2002 | Adachi et al. .................. 62/441 |

FOREIGN PATENT DOCUMENTS

| DE | 1 241 847 | 6/1967 |
| DE | 24 53 796 | 5/1976 |
| JP | 2003-75046 | 3/2003 |

OTHER PUBLICATIONS

Machine translation of Ballarin DE Patent No. 2453796, Jan. 5, 2010.*
Machine translation of Fujisawa JP Publication No. 2003-075046, Jan. 5, 2010.*
International Search Report PCT/EP2005/052628.

* cited by examiner

*Primary Examiner* — Steve M Gravini
*Assistant Examiner* — Filip Zec
(74) *Attorney, Agent, or Firm* — Nixon & Vanderhye P.C.

(57) ABSTRACT

The invention relates to a refrigerating appliance having an evaporator area and at least two cooling areas partitioned off from one another inside the housing of the refrigerating appliance. A wall has a solid inner skin, a solid outer skin and a layer made of expanded insulating material located between the inner and outer skin. A cold air supply channel in the wall extends from the evaporator area past the first cooling area to the second cooling area. A shaped part made of an insulating material extends between the cold air supply channel and the inner skin of the wall. The cold air supply channel is separated from the expanded insulating material by a partition.

19 Claims, 6 Drawing Sheets

REFRIGERATING APPLIANCE WITH CIRCULATING AIR COOLING

This application is a U.S. National Phase of International Application No. PCT/EP2005/052628, filed Jun. 8, 2005, which designates the U.S. and claims priority to German Application No. 102005021560.2, filed May 10, 2005, German Application No. 102005021535.1, filed May 10, 2005, and German Application No. 102005021557.2, filed May 10, 2005, the entire contents of each are hereby incorporated by reference.

BACKGROUND OF THE INVENTION

The present invention relates to a refrigerating appliance with circulating air cooling, i.e. a refrigerating appliance in the housing of which an evaporator area and a cooling area for accommodating refrigerated goods are partitioned off from one another and the cooling area is cooled by cold air supplied from the evaporator area. In particular the invention relates to a refrigerating appliance with circulating air cooling which features two or more cooling areas partitioned off from each other.

If in such a refrigerating appliance the first cooling area lies between the evaporator area and the second cooling area, the cold air must be directed from the evaporator area on a supply path running along the first cooling area to the second cooling area. To be able to maintain the temperatures in the two cooling areas independently of each other, the supply channel of the second cooling area should be insulated from the first area, so that cold air flowing on the supply channel to the second cooling area does not also cool the first cooling area when not required to do so and thereby enters the second cooling area warmer than expected.

Conventionally such a supply channel is implemented by a pipe run in a wall of the refrigerator housing, which is embedded into insulating material of the wall. The extent of the pipe within the thickness of the wall must kept small to enable a sufficient thickness of insulation material to be also accommodated in the wall. In order to obtain a sufficient free cross-sectional surface of the pipe despite this, an elongated flat cross-sectional shape is therefore generally selected. The distance between this pipe and the inner skin of the wall must be large enough so that, if the wall is foam filled in the conventional manner to form an insulating layer, this foam can penetrate unhindered between the inner skin and the pipe to create an effective insulation therein. However the wider the pipe is, the greater is the distance of the pipe from the inner skin required for this. The result is that it must be that much closer to the outer skin and consequently the insulation of the supply channel from the surroundings of the appliance is that much worse. This is very disadvantageous since the air circulating in the supply channel is colder than the cooling areas themselves, so that in the insulation layer between it and the surroundings an especially large drop in temperature occurs and accordingly the heat inflow into the appliance at this point is especially great.

Naturally this heat inflow can be reduced by the thickness of the insulation layer being increased at least in the vicinity of the cool air supply channel, but this leads to a loss of usable volume in the cooling area past which the supply channel is routed.

SUMMARY OF THE INVENTION

The object of the invention is thus to create a refrigerating appliance with circulating air cooling in which an effective insulation of a cold air supply channel running along a wall of the appliance is guaranteed both from the surroundings and also from the adjacent cooling area, with a small wall thickness.

The object is achieved, in a refrigerating appliance with a housing, in which an evaporator area and at least two cooling areas are partitioned off from each other and of which one wall features a rigid inner skin, a rigid outer skin and a layer lying between them made of expanded insulating material, with a cold air supply channel running in the wall from the evaporator area past the first cooling area to the second cooling area, on the one side a shaped part made from an insulating material extends between the cold air supply channel and the inner skin of the wall and on the other side the cold air supply channel is separated from the expanded insulating material by a partition wall.

The partition wall is preferably formed by an extruded profile especially made of plastic, which can be manufactured at low cost.

By the shaped part being inserted between the supply channel and the inner skin the seamless nature of the insulation between the supply channel and the inner skin is guaranteed, however small the distance between the supply channel and the inner skin may be, or however large the width of the supply channel may be. The partition wall protects the supply channel against becoming blocked by penetration of the insulation material when the insulation material expands.

The partition wall which, in general, to achieve a sufficient pressure resistance against the expanded insulating material, will consist of a solid plastic material, preferably has a U-shaped cross-section with a floor and two legs emanating from the floor, of which the free ends touch the inner skin and thus delimit a channel separated from the expanded insulating material. In this channel the shaped part is enclosed between the partition wall and the inner skin in order to insulate the cold air supply channel from the inner skin.

To save on material costs and simultaneously to have the largest possible free cross section available for the cold air supply channel, it is desirable to make the strength of the partition wall as low as possible. To still guarantee a sufficient pressure resistance of the partition wall in relation to the expanded insulating material, the partition wall can be provided with at least one rib protruding from the floor and supported on the shaped part.

Such a rib is usefully widened out at its end resting on the shaped part in order to distribute the force transmitted from the rib onto the shaped part over a large area and thus keep the pressure to which the shaped part is subjected low. This allows the density of the shaped part to be kept down, which is both favorable for the insulation of the cold air supply channel in relation to the inner skin and also saves material and costs.

As an alternative or in addition to this the partition wall can be part of a hollow profile with at least one cavity through which the cold air supply channel runs. In this case a wall of the hollow space facing the inner skin is preferably supported on the shaped part in order to transmit over a wide area the force exerted by the expanded insulating material on the shaped part. An especial advantage of the enclosed hollow space is that, in the event of the shaped part being damaged, no fragments of this get into the cavity and can adversely affect the air flow therein. A low mechanical strength of the shaped part associated with its low density can thus be accepted without any problem.

Preferably the shaped part has a U-shaped cross-section with a floor resting against the outer skin and with two legs extending from this floor up to the floor of the U-shaped partition wall.

A cold air distributor channel which communicates through openings in the inner skin with the first cooling area can advantageously be routed separately from the cold air supply channel between the partition wall and the inner skin.

Such a cold air distributor channel can advantageously be insulated by one of the above-mentioned legs of the shaped part from the cold air supply channel.

Since the cold air distributor channel does not have to extend for the same length as the cold air supply channel into the second cooling area, the shaped part can usefully be provided with at least one projection blocking off the cold air distributor channel.

BRIEF DESCRIPTION OF THE DRAWINGS

Further features and advantages of the invention emerge from the subsequent description of exemplary embodiments. The figures show.

DETAILED DESCRIPTION OF THE INVENTION

Figure 1:
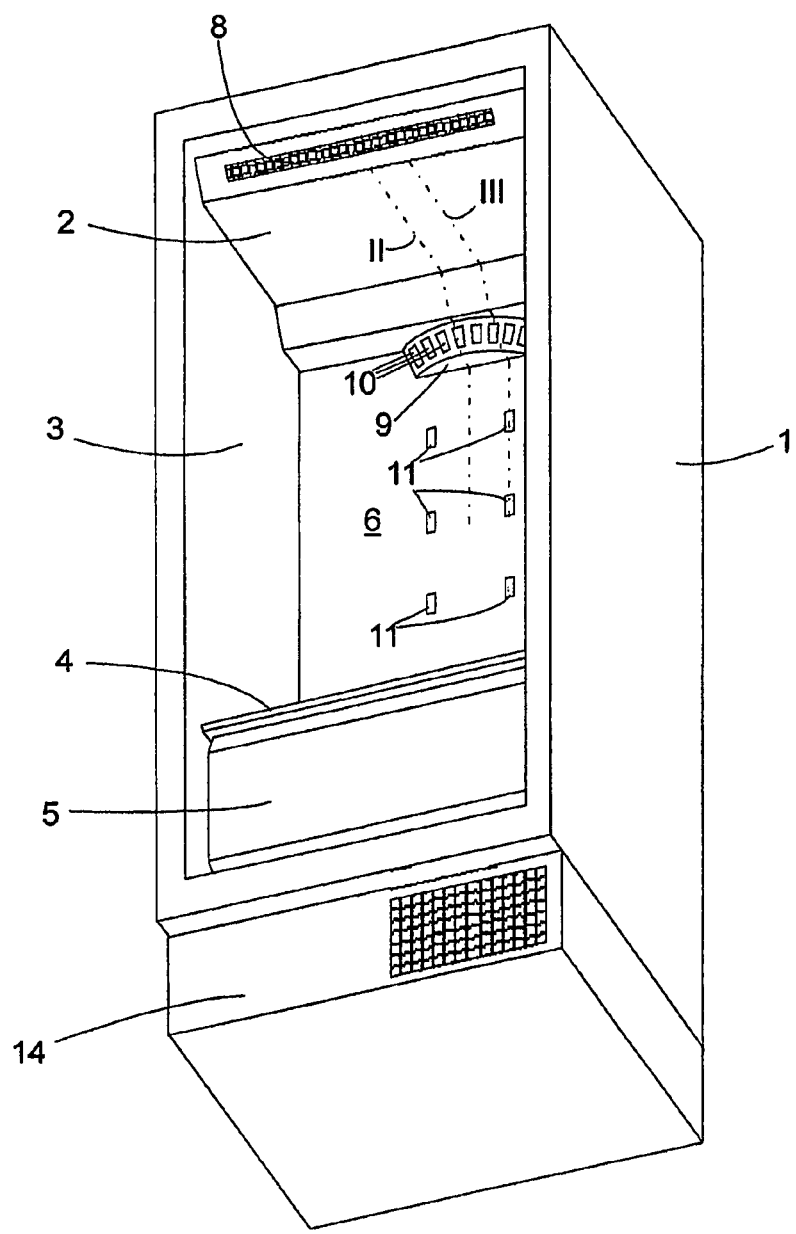
FIG. 1 a perspective view at an angle from below the carcass of an inventive refrigerating appliance.

FIG. 1 shows a perspective view of a carcass 1 of an inventive refrigerating appliance. The appliance has a door which is not shown in the figure. The interior of the carcass 1 is subdivided into an evaporator area 2 at the top below the roof of the carcass 1, a first cooling area 3 and, separated from this by an insulating partition wall 4, a second cooling area 5. A pull-out container is accommodated in the second cooling area 5. The first cooling area 3 is normally divided up into a number of refrigerated goods carriers in compartments lying above one another, which are however omitted from the figure to allow as large an area as possible of the rear wall 6 of the carcass 1 to be shown.

On the front side of a partition wall 7 separating the evaporator area 2 from the first cooling area 3 (see FIG. 2) is formed an air inlet opening 8 through which the air can enter from the first cooling area 3 into the evaporator area 2. Lines through which air can flow from the second cooling area 5 to the evaporator area 2 can run in sidewalls of the carcass 1—not visible in the figure; another option is an air line within the door which starts at the height of the second cooling area 5 and ends opposite the air inlet opening 8.

Adjacent to the rear wall 6, attached to the partition wall 7, is a distributor hood 9 on which a plurality of air holes 10 is formed, through which cold air moving out of the evaporator area 2 distributes itself into the upper part of the first cooling area 3 in various directions. Below the distributor hood 9 there are a number of pairs of openings 11 located on the rear wall 6, out of which cold air can also flow. The height of these pairs of openings 11 is selected so that, if refrigerated goods carriers are fitted in the first cooling area 3, each pair of openings 11 supplies one compartment.

Figure 2:
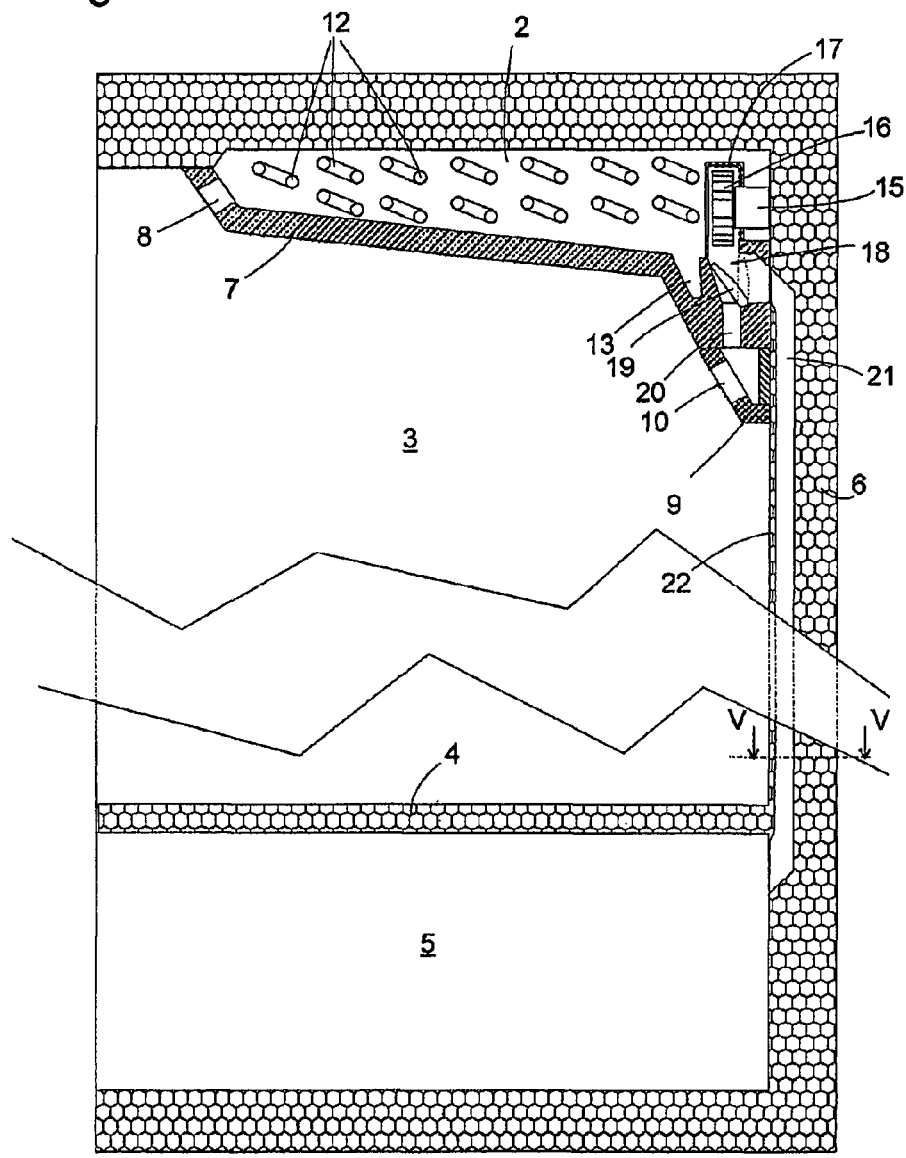
FIG. 2 a section through a plane running vertically and in the depth direction through the carcass along the line II from FIG. 1.

FIG. 2 shows the refrigerator of FIG. 1 in a section along a center plane extending vertically and towards the back of the carcass 1, which is shown in FIG. 1 by a dotted and dashed line II. In the interior of the evaporator area 2 cooling slots of an evaporator 12 are to be seen in the section, onto which air penetrating through the air inlet opening 8 flows. The partition wall 7 slopes back towards the rear wall 6 of the carcass into a gutter 13, in which condensation dripping from the evaporator 12 collects. The condensation reaches an atomizer in the base area 14 (see FIG. 1) of the carcass 1 via a pipe not shown in the diagram.

Behind the gutter 13, adjacent to the rear wall 6, is accommodated a fan which includes a motor 15, a fan blade wheel 16 driven by the motor and a housing 17. A suction opening of the housing 17, is formed on the front side of the housing in the axial direction of the fan wheel. The upper half of the housing 17 closely follows the circumference of the fan blade 16, at the bottom the housing 17 is open, so that a rotation of the fan blade 16 causes air accelerated outwards to flow downwards into a chamber 18.

A hinged flap 19 is fitted in this chamber 18. In the position shown in the figure the flap 19 blocks a cold air supply opening 20, which leads vertically downwards to the first cooling area 3. The air is in this way forced to the rear wall 6 and into a cold air supply channel 21 which leads in the interior of the rear wall from the first cooling area 3 separated by a thin insulating layer 22, to the second cooling area 5. If the flap 19 hinged on a partition wall 20 between the cold air supply opening 20 and the cold air supply channel 21 is moved into the vertical position shown in the figure as a dotted outline, it blocks off the cold air supply path 21, and the stream of cold air reaches the distributor hood 9 through the cold air supply opening 20. One of the air holes 10, through which air flows out from the distributor hood 9 into the first cooling area 3, can be seen in the figure.

Figure 3:
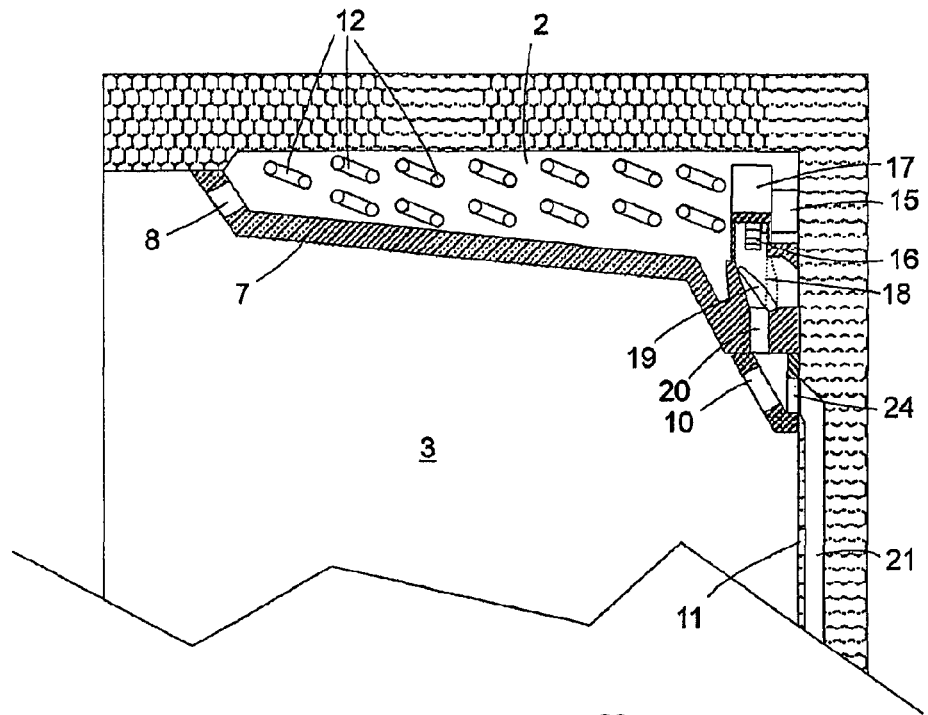
FIG. 3 a section through the upper area of the carcass in a plane offset to the side from the center plane along the line III from FIG. 1.

FIG. 3 shows a section through the upper part of the carcass 1 along the plane indicated in FIG. 1 by the number III. This figure clearly shows the curved housing 17 extending around the fan blade 16. It can also be seen that in this plane the side of the distributor hood 9 facing the rear wall 6 has an opening 24 which coincides with an opening of the rear wall 6 which leads to a distributor channel 25 extending vertically in the rear wall 6. One of the many further openings 11 leading from the distributor channel 25 into the first cooling area 3 can also be seen.

When the cold air supply opening 20 is open, the result of the diversion of the air flowing vertically upwards through this opening in a diagonally upwards and forwards direction to the air holes 10 of the hood 9 is a dynamic pressure in the inside of the hood 9, which forces a part of the air into the distributor channel 25. How large this part is can be defined by the appropriate definition of the cross sections of the air holes 10, of the openings 11, 24 and of the distributor channel 25.

Figure 4:
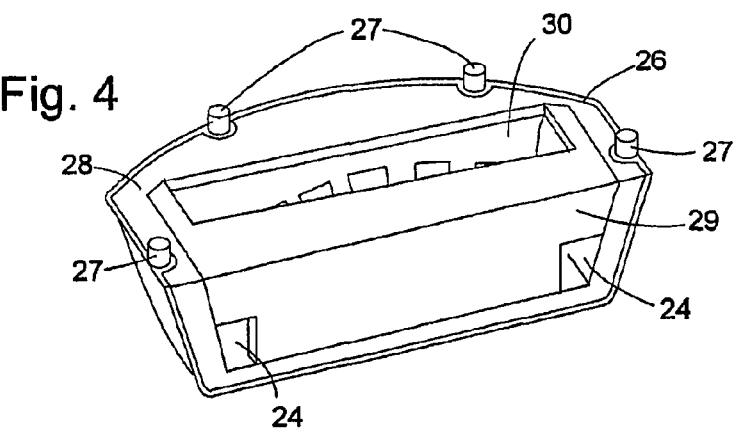
FIG. 4 a perspective view of the hood arranged at the cold air supply opening.

FIG. 4 shows a perspective view of the distributor hood 9. It is composed of a rigid outer skin 26, on which a plurality of pegs 27 for engaging in the partition wall 7 are formed, a first layer of expanded foam 28 lying against the inside of the outer skin 26 and able to be formed in one piece with the latter, and a second plastic body 29. On the upper side of the hood 9 the layer 28 and the foam body 29 form an outlet 30 coinciding with the cold air supply channel opening 20, and on the rear side of the hood as viewed in the figure, delimited by the layer 28 and the body 29, two openings 24 can be seen, which each lead to two distributor channels 25 which extend in the rear wall 6 adjacent to the cold air supply channel 21.

Figure 5:
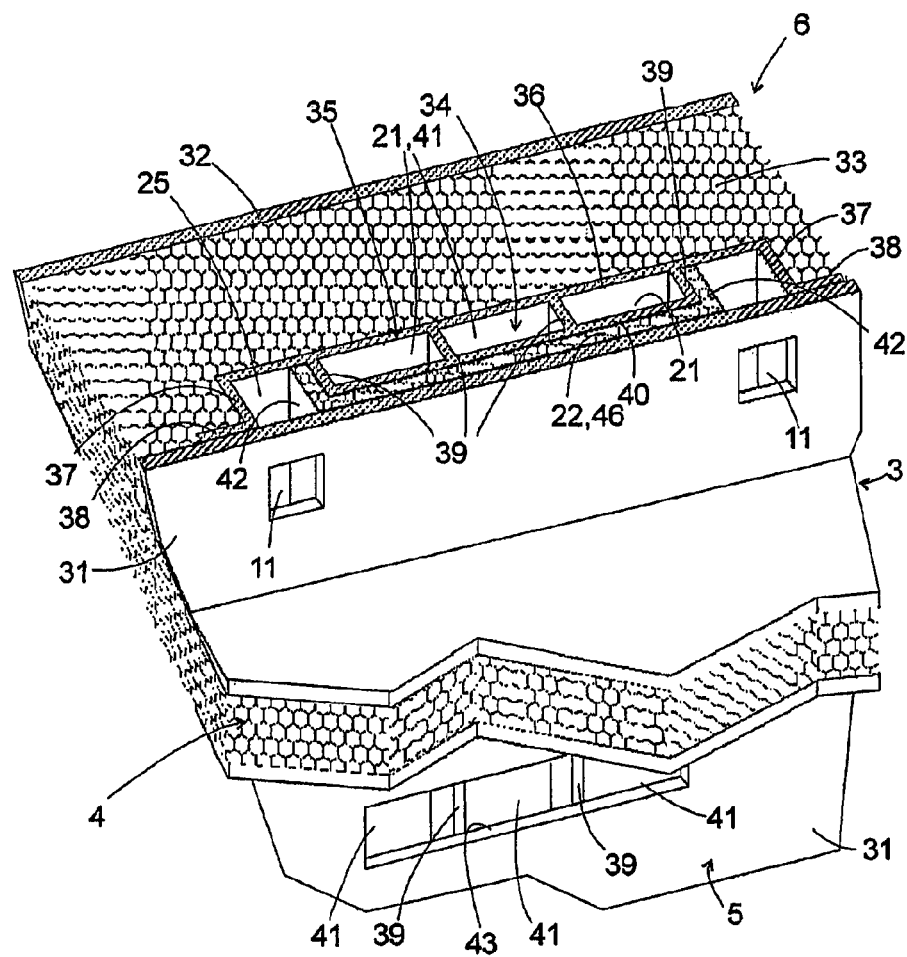
FIG. 5 a partly cut-away perspective detailed view of the carcass of the refrigerating appliance from FIG. 1.

FIG. 5 shows a section through the rear wall 6 of the carcass 1 at the height of the line labeled V-V in FIG. 2. The rear wall is constructed from a stiff inner skin 31 which, drawn from a plastic sheet, clads the inside of the carcass 1, an outer skin 32 and a layer 33 made of foamed insulation material. Cut out of the layer 33 is a vertical channel 34 which is delimited from the insulating layer 33 by a solid plastic extruded profile 35. The extruded profile 35 has a rear wall 36, side walls 37 extending from the edges of the rear wall 36 to the inner skin 31 and at the edges of the side walls an elongated flange 38 glued to the inner skin 31 to form a tight seal with the foam. Ribs 39 projecting from the rear wall 36 carry a front wall 40 parallel to the rear wall 36 which rests against the insulation layer 22 formed as a flat U-shaped profile 46 already mentioned and is supported on this against the pressure operating on expansion of the insulation foam layer 33 on the rear side of the wall 36. The rear wall 36, the ribs 39 and the front wall 40 here delimit three adjacent cavities 41 extending over the length of the extruded profile, which together form the cold air supply channel 21.

To the right and the left of the cold air supply channel 21, separated from this in each case by a rib 39 of the extruded profile 35 and by the leg 42 extending through to the rear wall 36 of the profile forming the insulation layer 22, extends a distributor channel 25 in each case.

Below the partition wall 4 of which only fragments are shown, in the second cooling area 5, an opening 43 is cut into the inner skin 31, at which the cold air supply channel 21 emerges. Another two of the ribs 39 which separate the three cavities 41 of the cold air supply channel 21 from each other can be seen in the opening 43.

Figure 6:
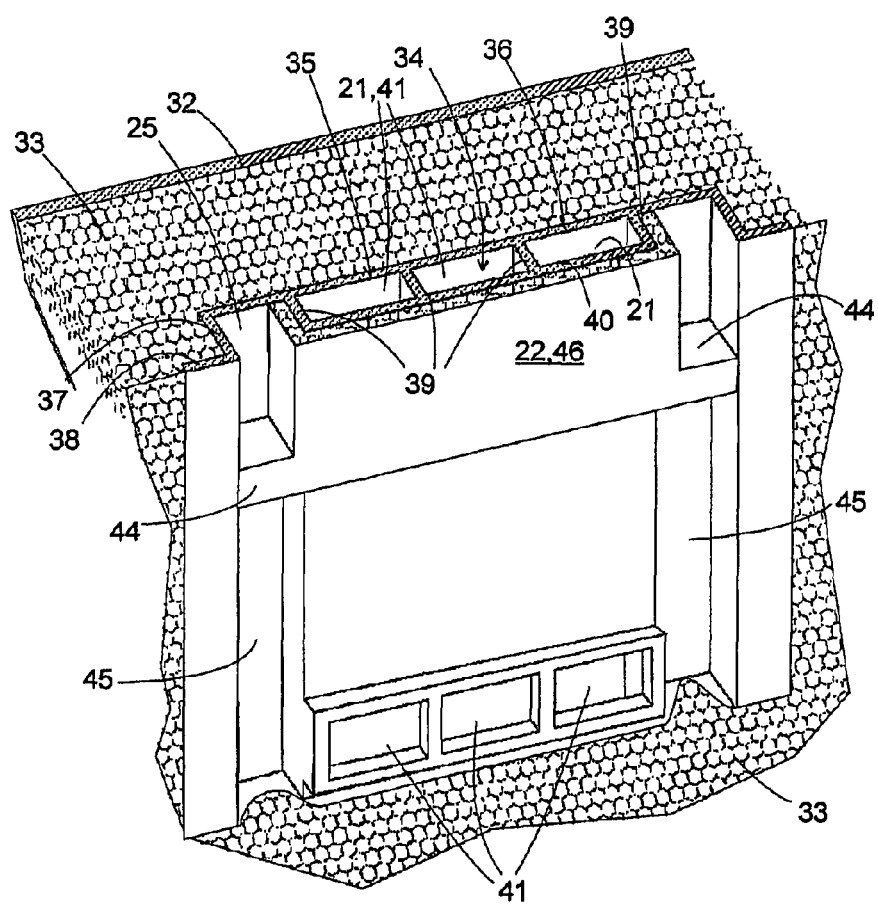
FIG. 6 a view from the same perspective as FIG. 5, with inner skin and partition wall omitted.

FIG. 6 shows the same section of the rear wall 6 of the carcass 1 as shown in FIG. 5, but with the inner skin 31 and partition wall 4 omitted. As can be seen, the insulating layer 22 ends at the height of the partition wall 4, and two projections 44 protruding sideways from it block off the distributor channels 25 in each case immediately below the lowest through openings 11 shown in FIG. 5. The cavities 45 lying in the extension of the distributor channels 25 below the projections 44 can, as shown in the figure, be left open at the bottom, so that insulation material can penetrate into the layer 33 when the foam is introduced into these cavities 45. The foamed insulating material cannot pass the projections 44 pressed tightly and if necessary elastically against the inner skin 31 and the extruded profile 35, so that the distributor channels 25 remain free. The cavities 41 are tightly sealed at the end of the extruded profile 35 in order to protect them from penetration by the insulation material.

When the foam is introduced the insulating material of layer 33 presses against a large area of the rear wall 36 of the extruded profile 35, but the latter is not significantly deformed by this, since its front wall 40 can be supported on the preshaped insulation layer 22 of the profile 46. Because of the large contact surface between the front wall 40 and the insulation layer 22 the latter can have a small thickness without running the risk of being pushed out of shape when the foam is introduced. Even if a deformation of the extruded profile 35 and of the inner skin 31 occurring under the pressure of the foam layer 33 should be great enough for pieces to break off the insulation profile 46 there is no danger of the cold air supply channel becoming blocked since this runs in the fully enclosed cavities 41.

Below the projections 44 where the extruded profile 35 is no longer supported by the insulation profile 46, the pressure acting on the rear side of the extruded profile 35 contributes to the tightness of the connection of the opening-out area of the cold air supply channel at the opening 43 of the inner skin.

Figure 7:
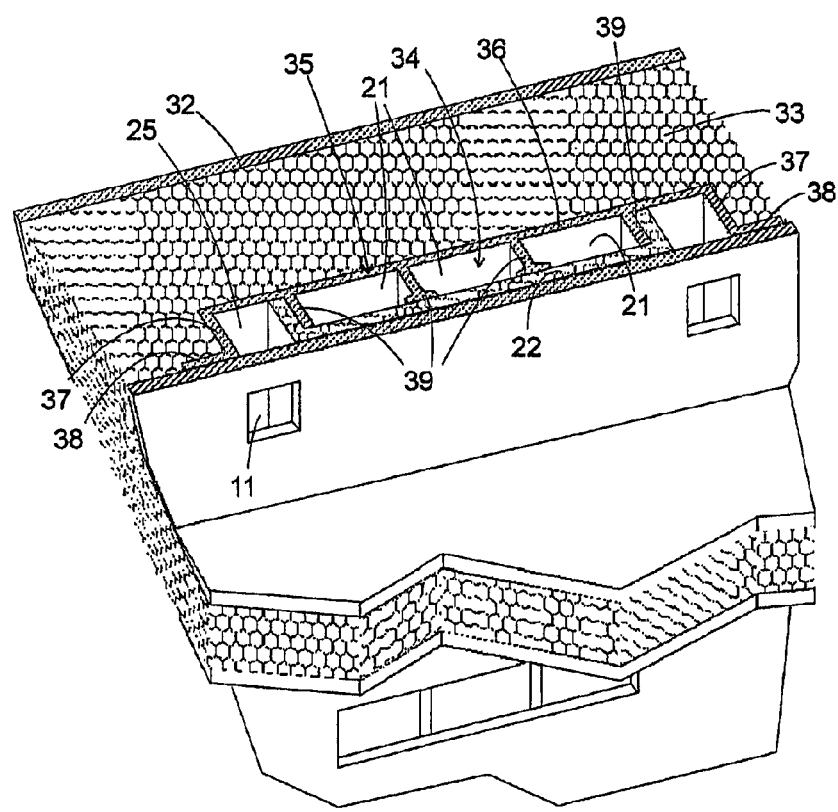
FIG. 7 a view similar to that shown in FIG. 5 in accordance with a second embodiment of the refrigerating appliance.

An alternate embodiment of the extruded profile 35 is shown in FIG. 7 in a view similar to that shown in FIG. 5. Instead of forming a number of closed cavities the extruded profile 35 here has a number of slots open through to the insulating profile 46 and separated from one another by the rib 39, which form the cold air supply channel. Of the four ribs 39 the two center ribs are widened out at their end touching the insulating layer 22 of the profile 46 in order to distribute a pressure exerted by the insulating material layer 33 on the extruded profile 35 over a large area of the insulating layer.

The invention claimed is:

1. A refrigerating appliance comprising:
 a housing in which an evaporator zone, a first cooling zone, and a second cooling zone are disposed, the evaporator zone, the first cooling zone, and a the second cooling zone each being separated one from another, the housing having a wall formed of a rigid inner skin, a rigid outer skin, and an intermediate layer intermediate the rigid inner skin and the rigid outer skin that is made of expanded insulating material;
 a cold air supply arrangement including:
  a second cooling zone distributor pipe that extends along the housing wall of the housing and has at least one entry aperture via which air enters the second cooling zone distributor pipe and at least one wall distributed opening communicated with the second cooling zone such that the second cooling zone is cooled with cold air supplied from the evaporator zone that flows via the second cooling zone distributor pipe from the evaporator zone, past the first cooling zone, and thereafter to the second cooling zone, and
  a first cooling zone distributor pipe;
 a shaped part made from an insulating material extending between the cold air supply arrangement and the rigid inner skin; and
 a partition wall that separates the cold air supply arrangement from the intermediate layer of the housing,
 wherein the first cooling zone distributor pipe and the second cooling zone distributor pipe are separated by a first portion of the shaped part and a first portion of the partition wall, and the second cooling zone distributor pipe is separated from the first cooling zone by a second portion of the shaped part and the rigid inner skin,
 wherein the shaped part and the partition wall are made from different materials, and
 wherein the shaped part insulates the second cooling zone distributor pipe from the first cooling zone distributor pipe and the first cooling zone.

2. The refrigerating appliance as claimed in claim 1, wherein the partition wall is configured as an extruded profile.

3. The refrigerating appliance as claimed in claim 1, wherein the partition wall has a U-shaped cross-section with a floor and two legs extending from the floor, each of which has a free end that contacts the inner skin of the housing wall, and the shaped part is enclosed between the partition wall and the inner skin of the housing wall.

4. The refrigerating appliance as claimed in claim 3, wherein the partition wall includes at least one rib projecting from the floor and the rib has an end that is supported on the shaped part.

5. The refrigerating appliance as claimed in claim 4, wherein the rib extends outwardly to a larger width at its end that is supported on the shaped part.

6. The refrigerating appliance as claimed in claim 1, wherein the partition wall is configured as a hollow profile with at least one cavity through which extends the cold air supply arrangement.

7. The refrigerating appliance as claimed in claim 6, wherein a wall of the cavity facing towards the inner skin of the housing wall is supported on the shaped part.

8. The refrigerating appliance as claimed in claim 1, wherein the shaped part has a U-shaped cross-section with a floor lying against the outer skin of the housing wall and two legs extending from the floor up to a wall of the partition.

9. The refrigerating appliance as claimed in claim 1, wherein the first cooling zone distributor pipe extends along the housing wall of the housing and has at least one entry aperture via which air enters the first cooling zone distributor pipe and a plurality of first wall-distributed opening in the inner skin of the housing wall that communicates the first cooling zone distributor pipe with the first cooling zone such that the first cooling zone is cooled with cold air supplied from the evaporator zone via the first cooling zone distributor pipe and the first cooling zone distributor pipe is separated from the second cooling zone distributor pipe between the partition wall and the inner skin of the housing wall.

10. The refrigerating appliance as claimed in claim 9, wherein the shaped part includes a leg that insulates the first cooling zone distributor pipe from the second cooling zone distributor pipe.

11. The refrigerating appliance as claimed in claim 9, wherein the shaped part includes at least one projection blocking off the second cooling zone distributor pipe.

12. A refrigerating appliance comprising:
  a housing comprising an evaporator zone, a first cooling zone, and a second cooling zone, the evaporator zone, the first cooling zone, and a the second cooling zone each being separated one from another;
  a cold air supply duct that extends between the evaporator zone and the second cooling zone such that the second cooling zone is cooled with cold air supplied from the evaporator zone, the cold air supply duct being adjacent to and routing the cold air past the first cooling zone, the cold air supply duct comprising:
    a first duct portion made of a first material and comprising a rear wall, a first side wall and a second side wall that form a first channel profile;
    a second duct portion made of a second material and comprising a front wall, a third side wall and a fourth side wall that form a second channel profile, and
    a rear wall of the first cooling zone,
    wherein the first duct portion and the second duct portion are nested within one another and form a closed duct profile with the rear wall, the closed duct profile including a first cooling zone duct and a second cooling zone duct that are separated by a wall formed of a layer of the first material and a layer of the second material so that the second duct portion insulates the second cooling zone duct from the first cooling zone duct and from the first cooling zone.

13. The refrigerating appliance according to claim 12, wherein one of the first channel profile and the second channel profile is inverted with respect to the other.

14. The refrigerating appliance according to claim 12, wherein the first duct portion further comprises a fifth side wall and a sixth side wall that are disposed between the third side wall and the fourth side wall.

15. The refrigerating appliance according to claim 14, wherein the third side wall is between the first side wall and the fifth side wall and the fourth side wall is between the second side wall and the sixth side wall.

16. The refrigerating appliance according to claim 15, further comprising a wall parallel to and between the rear wall and the front wall, the wall forming a closed duct with the rear wall, the fifth side wall and the sixth side wall.

17. The refrigerating appliance according to claim 12, wherein a second closed duct profile is formed interior to first channel profile and exterior to the second channel profile, the second closed duct profile providing cooled air from the evaporator zone to the first cooling zone.

18. The refrigerating appliance according to claim 17, further comprising a wall that delimits the first cooling zone and form part of the second closed duct profile.

19. The refrigerating appliance according to claim 12, wherein the second duct portion is formed from expanded insulating material.

* * * * *